United States Patent
Schueler

(10) Patent No.: US 9,977,047 B2
(45) Date of Patent: May 22, 2018

(54) METHOD AND DEVICE FOR CALIBRATING AN ACCELERATION SENSOR IN A MOTOR VEHICLE

(71) Applicant: Robert Bosch GmbH, Stuttgart (DE)

(72) Inventor: Matthias Schueler, Steinheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 386 days.

(21) Appl. No.: 14/614,977

(22) Filed: Feb. 5, 2015

(65) Prior Publication Data
US 2015/0219683 A1 Aug. 6, 2015

(30) Foreign Application Priority Data
Feb. 5, 2014 (DE) .......................... 10 2014 202 026

(51) Int. Cl.
 *G01P 21/00* (2006.01)
(52) U.S. Cl.
 CPC .................... *G01P 21/00* (2013.01)
(58) Field of Classification Search
 CPC ....................................................... G01P 21/00
 See application file for complete search history.

(56) References Cited

U.S. PATENT DOCUMENTS

2007/0067137 A1* 3/2007 Ohkubo ................. G01C 21/28
702/142

FOREIGN PATENT DOCUMENTS

| DE | 19812426 | 9/1999 |
|---|---|---|
| DE | 1315945 | 6/2003 |
| DE | 102004003877 | 8/2004 |

\* cited by examiner

*Primary Examiner* — Robert R Raevis
(74) *Attorney, Agent, or Firm* — Norton Rose Fulbright US LLP; Gerard Messina

(57) ABSTRACT

A method is provided for calibrating an acceleration sensor for ascertaining a longitudinal acceleration of a motor vehicle. One or multiple sensor parameter(s) of a sensor model of the acceleration sensor is/are determined, via which the actual longitudinal acceleration of the motor vehicle is ascertainable from a physical sensor variable. The method includes the following steps:
 ascertaining a change in a vehicle speed during travel over a measuring section;
 ascertaining a change in the longitudinal acceleration of the motor vehicle during travel over the measuring section with the aid of the acceleration sensor to be calibrated;
 ascertaining a change in the height position of the motor vehicle during travel over the measuring section; and
 ascertaining the one or the multiple sensor parameter(s) of the sensor model based on the change in the vehicle speed, the change in the longitudinal acceleration of the motor vehicle, and the change in the height position of the motor vehicle during travel over the measuring section.

8 Claims, 1 Drawing Sheet

METHOD AND DEVICE FOR CALIBRATING AN ACCELERATION SENSOR IN A MOTOR VEHICLE

FIELD OF THE INVENTION

The present invention relates to a calibration method for acceleration sensors in a motor vehicle, in particular a calibration method with the aid of an independent detection of the position or speed of the motor vehicle.

BACKGROUND INFORMATION

Drive systems for motor vehicles are continuously monitored for malfunctions. Thus, for example, monitoring of the motor vehicle with regard to an unintended acceleration is generally carried out by continuous torque monitoring by the control unit, or by acceleration monitoring based on a vehicle acceleration ascertained from the wheel speeds. One alternative is acceleration monitoring based on a measurement of a longitudinal acceleration of the motor vehicle with the aid of an acceleration sensor.

When an inertial sensor, for example, is used as the acceleration sensor, accelerations which are exerted by external forces may be measured. Naturally, however, accelerations which are caused by gravitational force cannot be measured using this measurement principle. In other words, there is a difference between monitoring of the vehicle acceleration with the aid of an acceleration sensor and mere evaluation of wheel speeds, in that the measurement of the acceleration with the aid of the acceleration sensor does not include the gravitational influence during uphill or downhill travel. In particular, when an acceleration sensor is used, a continuous speed of the vehicle during uphill or downhill travel also results in an acceleration value that is necessary to counteract the gravitational influence. This sensor behavior is advantageous for vehicle monitoring, since the driver takes a possible acceleration or deceleration due to gravitation into account in his/her driving input, and the engine control system thus also appropriately adapts the driver input torque.

In addition, an acceleration sensor that is used for monitoring a vehicle acceleration must be calibrated, adjusted, or adapted in order to reduce its tolerances. If the calibration is carried out, for example, with the aid of a vehicle speed which is measured via the wheels, calibration errors may result, since the speed signal of the wheels includes the gravitational influence, but the sensor does not.

In order to reduce the gravitational influence during a calibration during uphill or downhill travel, such an adaptation of the acceleration sensor must be carried out over a fairly long period of time. However, any height difference between the initial point and end point of the calibration measurement results in a residual error which adversely affects the sensor calibration.

German Published Patent Application No. 19 812 426 relates to a method for calibrating an onboard autonomous acceleration sensor based on an integrated course angle which is ascertained with the aid of a navigation system.

German Published Patent Application No. 10 2004 003877 provides a vehicle response detector which includes an autonomous acceleration sensor and a radio navigation position finding unit. With the aid of a calibration unit, detection information may be calibrated by the autonomous acceleration sensor by utilizing position information from the radio navigation position finding unit.

European Patent No. EP 1 315 945 relates to a vehicle navigation system in which orientations of axes of acceleration sensors are corrected with respect to axes of a frame of a vehicle.

SUMMARY

According to the present invention, a method for calibrating or adapting an acceleration sensor for ascertaining a longitudinal acceleration of a vehicle, and the device for calibrating the acceleration sensor and the motor vehicle, are provided.

According to a first aspect, a method for calibrating an acceleration sensor for ascertaining a longitudinal acceleration of a motor vehicle is provided, one or multiple sensor parameter(s) of a sensor model of the acceleration sensor being determined, via which the actual longitudinal acceleration of the motor vehicle is ascertainable from a physical sensor variable, including the following steps:

ascertaining a change in a vehicle speed during travel over a measuring section;

ascertaining a change in the longitudinal acceleration of the motor vehicle during travel over the measuring section with the aid of the acceleration sensor to be calibrated;

ascertaining a change in the height position of the motor vehicle at the beginning and end of, or during travel over, the measuring section; and ascertaining the one or multiple sensor parameter(s) of the sensor model based on the change in the vehicle speed, the change in the longitudinal acceleration of the motor vehicle, and the change in the height position of the motor vehicle during travel over the measuring section.

A concept of the above method is that for a measuring section, a change in the height position of the motor vehicle, i.e., the height difference traveled over the measuring section, is taken into account in the determination of the sensor parameters of a sensor model, which is necessary for calibrating the acceleration sensor. During uphill and downhill travel, the influence of gravity on the calibration of the acceleration sensor may thus be taken into account for measuring the longitudinal acceleration of the motor vehicle.

This results in a more accurate calibration of the acceleration sensor which is less subject to tolerances, so that the acceleration sensor may be reliably used for safety-critical acceleration monitoring of the motor vehicle.

In addition, the change in a vehicle speed during travel over a measuring section may be effected with the aid of a means which is different from the acceleration sensor.

According to one specific embodiment, the one or the multiple sensor parameter(s) of the sensor model of the acceleration sensor may include a sensor gain and/or a sensor offset.

It may be provided that the change in the height position of the motor vehicle during travel over the measuring section is provided:

by specifying a value of 0 when the measuring section has been recognized or determined as a round trip;

by ascertaining the height positions at the beginning and at the end of the measuring section with the aid of a global positioning system; or by measuring a change in air pressure at the beginning and at the end of the measuring section, and by determining the height position of the motor vehicle as a function of the change in air pressure.

It may be provided that the end of a calibration measurement is reached after a predefined time or distance according to the degree to which certain additional criteria, such as the achieved minimum acceleration and/or minimum deceleration, are met, or when important basic conditions are no longer met. If the measurement is terminated early, a check is made as to whether the measurement is evaluatable, and if not, the measurement is discarded.

The ascertainment of the change in a vehicle speed during travel over a measuring section may be carried out by evaluating wheel speed information of a wheel speed sensor.

In addition, the wheel speed sensor may be calibrated with the aid of position or speed information which is ascertained from a global positioning system and/or navigation map data, the calibration in particular relating to an adaptation of a wheel radius of the wheel which is provided with the wheel speed sensor.

It may be provided that the ascertainment of the change in a vehicle speed during travel over a measuring section is carried out by evaluating position information which is ascertained from a global positioning system and/or navigation map data.

As an alternative to computing a speed with the aid of position information, the speed may be directly determined with the aid of the Doppler effect, based on the points in time of received signals.

According to another aspect, a calibration device for calibrating an acceleration sensor for ascertaining a longitudinal acceleration of a motor vehicle is provided, one or multiple sensor parameter(s) of a sensor model of the acceleration sensor being determined, via which the actual longitudinal acceleration of the motor vehicle is ascertainable from a physical sensor variable, the calibration device being designed to:
  ascertain a change in a vehicle speed during travel over a measuring section;
  ascertain a change in the longitudinal acceleration of the motor vehicle during travel over the measuring section, with the aid of the acceleration sensor to be calibrated;
  ascertain a change in the height position of the motor vehicle during travel over the measuring section; and
  ascertain the one or the multiple sensor parameter(s) of the sensor model of the acceleration sensor based on the change in the vehicle speed, the change in the longitudinal acceleration of the motor vehicle, and the change in the height position of the motor vehicle during travel over the measuring section.

According to another aspect, a system for a motor vehicle is provided which includes:
  an acceleration sensor for providing information concerning a longitudinal acceleration of the motor vehicle;
  a control unit for carrying out a monitoring function for monitoring the motor vehicle as a function of an actual longitudinal acceleration, the control unit including a sensor model in order to ascertain the actual longitudinal acceleration of the motor vehicle from a physical variable of the acceleration sensor; and
  the above-mentioned calibration device in order to ascertain or adapt the one or the multiple sensor parameter(s) of the sensor model.

DETAILED DESCRIPTION

Figure 1:
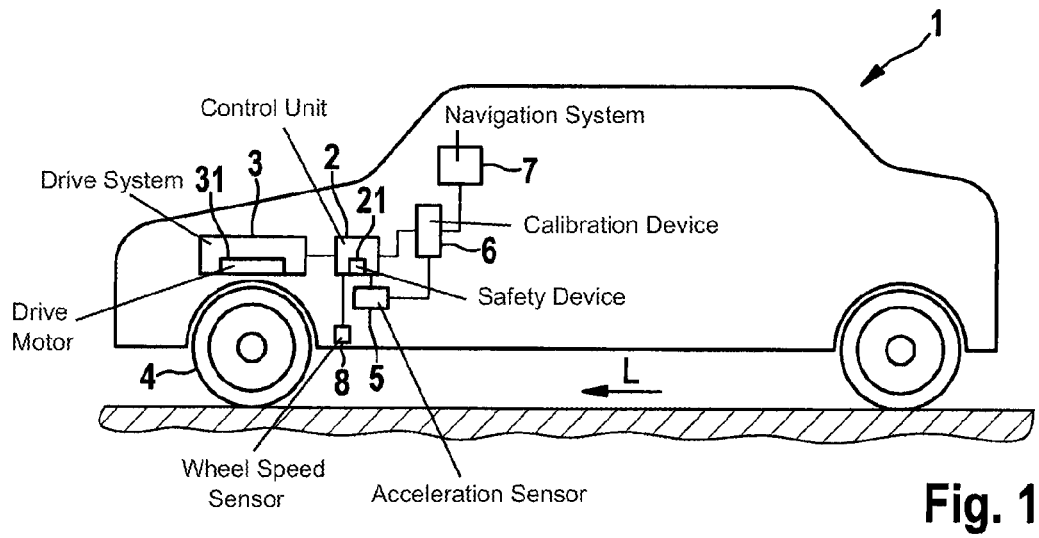
FIG. 1 shows a schematic illustration of a motor vehicle which includes a safety system having an acceleration sensor and a device for calibrating the acceleration sensor.

FIG. 1 shows a motor vehicle 1 which includes a control unit 2 and a drive system 3. Control unit 2 takes over the control and monitoring of a number of functions of motor vehicle 1 and of drive system 3. Drive system 3 includes at least one drive motor 31, in particular an internal combustion engine, and a corresponding drive train which connects drive motor 31 to one or multiple drive wheels 4.

Control unit 2 includes a safety device 21 which is designed for monitoring motor vehicle 1 for possible malfunctions; in the event that malfunctions occur, an emergency operation mode is adopted or an emergency shutdown is carried out in order to protect vehicle occupants and/or motor vehicle 1. One of the monitoring functions of safety device 21 is to monitor motor vehicle 1 for unintentional acceleration.

The acceleration monitoring may be carried out by safety device 21 with the aid of an acceleration sensor 5 provided for this purpose. Acceleration sensor 5 provides a physical sensor variable, such as a voltage, a current, a frequency, or the like which indicates an instantaneously measured longitudinal acceleration, i.e., an acceleration in longitudinal direction L of motor vehicle 1. With the aid of a sensor model and model parameters which specify the sensor model, such as a sensor offset and a sensor gain, the physical sensor variable may be converted into the actual longitudinal acceleration.

Acceleration sensor 5, which is designed for detecting a vehicle acceleration in a longitudinal direction L, must be calibrated or adapted for reducing tolerances and/or compensating for parameter fluctuations due to temperature changes, and/or over the service life, to be able to detect only the acceleration in longitudinal direction L as reliably as possible. This is necessary in particular due to the fact that safety device 21 is to preclude safety-critical malfunctions of motor vehicle 1. In particular an acceleration which takes place unintentionally due to a malfunction of motor vehicle 1 should be recognized early, so that it is necessary to use as acceleration sensor 5 a sensor with a sufficiently low tolerance to be able to set the triggering threshold for recognizing the malfunction as low as possible.

For calibration or adaptation of acceleration sensor 5, a calibration device 6 is provided which may be provided separately or integrated into control unit 2. Calibration device 6 determines the sensor offset and/or the sensor gain as model parameters for the sensor model which is implemented in the control unit, and provides the sensor offset and/or the sensor gain to safety device 21, so that the safety device may determine the actual instantaneous longitudinal acceleration of motor vehicle 1 based on the physical sensor variable.

For carrying out the calibration, calibration device 6 may rely on global position data to ascertain the instantaneous global position of the vehicle. The global position data may be provided, for example, by a position detection system or a navigation system 7, for example in the form of GPS data.

In addition, a wheel speed sensor 8 may be provided via which a wheel speed may be detected, and which transmits wheel speed information to calibration device 6, directly or via control unit 2.

Figure 2:
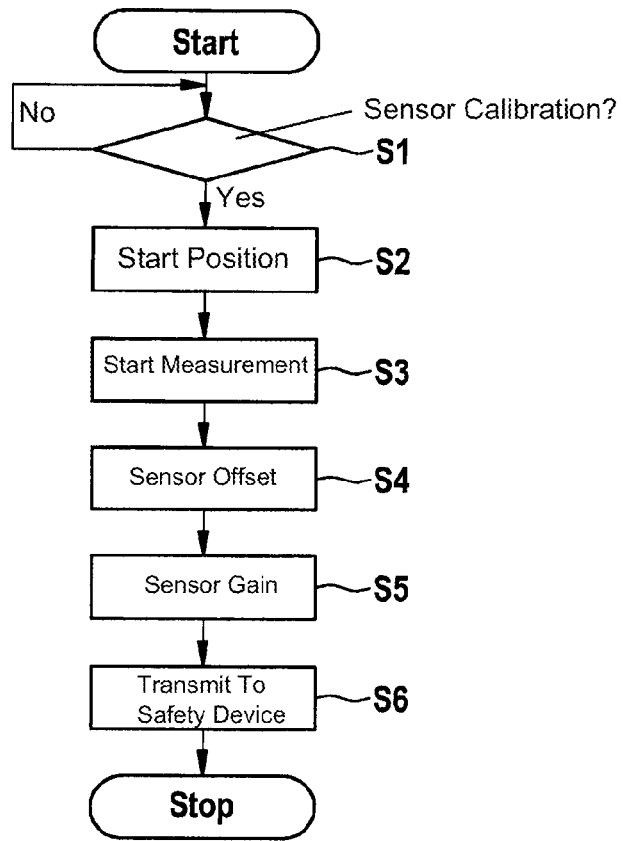
FIG. 2 shows a flow chart for illustrating a method for calibrating the acceleration sensor.

The calibration is carried out with the aid of calibration device 6. One specific embodiment of the calibration method carried out therein is described in greater detail with reference to the flow chart in FIG. 2.

A check is initially made in step S1 as to whether the instantaneous driving situation is suitable for a sensor calibration. If this is the case (alternative: yes), the calibration method is continued with step S2; otherwise (alternative: no) the method returns to step S1.

It is established that the instantaneous driving situation is suitable for a sensor calibration when
- the accuracy of a position and/or height position determination, for example, has been determined as sufficient by a signal of a global positioning system, possibly in conjunction with navigation map data, whereby in particular the quality of the satellite signal reception in the navigation system 7 may be used as an indication of the accuracy of the position detection; and/or
- stable sensor behavior of acceleration sensor 5 is present, i.e., for example, no short-term drift occurs due to temperature changes, for example after starting motor vehicle 1; and/or
- a route ahead which is to be expected is suitable for a calibration of acceleration sensor 5; and/or
- an air pressure sensor may be used, optionally with the use of a barometric height measurement, and compensation for a weather influence which may be provided is possible.

A start position is initially determined or established in step S2 as a starting point of the measuring section.

The measurement is started in step S3, position and/or speed data is/are recorded during travel over the measuring section, and a check is made as to whether the basic conditions for the calibration are met.

After reaching the end of the measuring section, or after the measurement is terminated due to some other termination condition, an ascertainment of the sensor offset is carried out in step S4 according to a method described below, provided that it is determined that the measurement can be evaluated.

The sensor gain is ascertained in subsequent step S5 according to one of the following methods. In other specific embodiments, it is also possible for only one of steps S4 or S5 to be carried out.

The sensor offset and/or the sensor gain is/are transmitted to safety device 21 in step S6, so that the physical sensor variable may be processed there based on the sensor offset and the sensor gain in order to determine the actual longitudinal acceleration of motor vehicle 1.

Several methods are possible for determining the sensor offset according to step S4. In a first method, the calibration of the acceleration sensor 5 is carried out with the aid of the wheel speed signals and with the aid of satellite navigation map data which indicate a height difference over the measuring section. The method for ascertaining the sensor offset provides that measuring section $s_{Fzg}(T)$ covered in time T is further computed as a reference from the wheel speed information or the vehicle speed ascertained therefrom:

$$s_{Fzg}(T) + s_0 + \int_0^T v_{Fzg}(t)dt = s_0 + 2t_{wheel} \pi Anz_{Umd\_wheel}(T),$$

where $s_0$ has been set to zero for simplification, and $Anz_{Umd\_wheel}(T)$ corresponds to the number of wheel revolutions during time T. In this regard, the wheel circumference, which is a function of the tire air pressure and tire condition, for example, is subject to tolerances, so that it may be provided to use an average value of multiple wheels 4 for the computation. The distance covered may also be computed from the measured vehicle acceleration by double integration:

$$v_{Sens}(t) = v_0 + \int_0^{t_1} a_{Sens}(t)dt$$

$$s_{Sens}(T) = s_0 + \int_0^T v_{Sens}(t_1)dt_1 = s_0 + v_0 T + \int_0^T \int_0^{t_1} a_{Sens}(t)dt dt_1.$$

where $v_0$ corresponds to the vehicle speed at point in time 0, and may be determined from the wheel speeds. In this computation, the sensor offset and sensor gain errors of acceleration sensor 5 as well as a signal component resulting from the slope must still be compensated for in order to be able to compare $s_{sens}$ to distance $s_{Fzg}(T)$ computed from the wheel speed signals. As a simplification, an initially linear behavior of acceleration sensor 5 with constant sensor offset $a_{offset}$ and constant sensor gain $k_{lin}$ is assumed, and is verified by checking the operating conditions during the calibration.

$$s_{Fzg}(T) \equiv s_{Sens,korr}(T)$$

$$s_{Sens,korr}(T) = s_0 + \int_0^T v_{Sens}(t_1)dt_1$$

$$= s_0 + v_0 T + \int_0^T \int_0^{t_1} (k_{lin} a_{Sens}(t) - a_{Offset} - a_{slope}(t)) dt dt_1$$

The acceleration signal component, which results from the slope over the measuring section, may be computed from the change in height signal h(t) in the satellite signal, or from the navigation map data and measuring section $s_{Fzg}(t)$ traveled.

$$a_{slope}(t) = g \frac{dh(t)/dt}{ds_{Fzg}(t)/dt}; g = 9.81 \frac{m}{s^2}$$

In the simplest case, the sensor offset may then be developed based on a round trip with initial speed and final speed v=0, duration $T_1$, and identical beginning height and ending height $h(0)=h(t_1)=0$. Round trips may also be identified only during the course of the measurement with the aid of the satellite data/navigation map data, where the following then applies:

$$v_{Fzg}(0)=0; v_{Fzg}(T_1)=0=\int_0^{T_1} a_{Fzg}(t)dt$$

$$\int_0^{T_1} a_{slope}(t)dt=0$$

from which it follows that $$\int_0^{T_1} (k_{lin} a_{Sens}(t) - a_{Offset} - a_{slope}(t)) dt = 0$$

$$a_{Offset} = \frac{1}{T_1} \int_0^{T_1} k_{lin} a_{Sens}(t) dt = k_{lin} \bar{a}_{Sens,1}.$$

If there is no round trip, the calibration may also be carried out on a distance whose beginning and ending heights are ascertained from the satellite data or the navigation map data, and $a_{slope}$ may thus be determined with sufficient accuracy. Possible error due to inaccurate height data may be reduced by selecting a longer measuring section. This is a significant advantage over calibration using wheel speed signals, in which an error in a wheel radius is multiplicatively entered into the computation, and cannot be averaged out over a longer distance. The following expression is obtained from the averaged slope component in the acceleration signal:

$$\bar{a}_{slope,1} = g \frac{h(T_1) - h(0)}{s_{Fzg}(T_1)}$$

$$a_{Offset} = \frac{1}{T_1} \int_0^{T_1} (k_{lin} a_{Sens}(t) - a_{slope}(t)) dt = k_{lin} \bar{a}_{Sens,1} - \bar{a}_{slope,1}.$$

If in addition the initial speed and final speed of the measurement are each different from 0, the equation may be expanded to:

$$\bar{a}_{Fzg,1} = \frac{1}{T_1}(v_{Fzg}(T_1) - v_{Fsg}(0)) = \frac{1}{T_1} \int_0^{T_1} (k_{lin} a_{Sens}(t) - a_{Offset} - a_{slope}(t)) dt$$

$$a_{Offset} = \frac{1}{T_1} \int_0^{T_1} k_{lin} a_{Sens}(t) dt - \bar{a}_{slope,1} - \frac{1}{T_1}(v_{Fzg}(T_1) - v_{Fsg}(0))$$

$$a_{Offset} = k_{lin} \bar{a}_{Sens,1} - \bar{a}_{slope,1} - \bar{a}_{Fzg,1}.$$

Using the computed sensor offset, which for a round trip is regarded below as $a_{Offset} = k_{lin} \bar{a}_{Sens,1}$ for simplification, and $s_0 = 0$, for a calibration measurement of duration $T_2$ this results in:

$$s_{Fzg,2} \equiv s_{Sens,korr,2}$$
$$= \int_0^{T_2} v_{Sens}(t) dt$$
$$= v_0 T_2 + \int_0^{T_2} \int_0^{t_1} (k_{lin} a_{Sens}(t) - k_{lin} \bar{a}_{Sens,1} - a_{slope}(t)) dt dt_1$$

$$s_{Fzg,2} \equiv v_0 T_2 - \frac{k_{lin} \bar{a}_{Sens,1}}{2} T_2^2 + \int_0^{T_2} \int_0^{t_1} k_{lin} a_{Sens}(t) dt dt_1 - \int_0^{T_2} \int_0^{t_1} a_{slope}(t) dt dt_1,$$

since the speed ascertained from the wheel speed information may be used as initial speed $v_0$ for $s_{Fzg,2}$ as well as for $s_{sens,korr}$, and no additional deviations are taken into account. The distance portion, which results from the slope component in the acceleration signal and which is to be compensated for, may be computed from height curve h(t), which may be determined based on the satellite data or navigation map data, and from the route ascertained from the wheel speed information:

$$s_{slope,2} = \int_0^{T_2} \int_0^{t_1} a_{slope}(t) dt dt_1 = \int_0^{T_2} \int_0^{t_1} g \frac{dh(t)/dt}{ds_{Fzg}(t)/dt} dt dt_1.$$

For the sensor gain of acceleration sensor 5, this results in:

$$s_{Fzg,2} \equiv v_0 T_2 - s_{slope,2} - \frac{k_{lin} \bar{a}_{Sens,1}}{2} T_2^2 + k_{lin} \int_0^{T_2} \int_0^{t_1} a_{Sens}(t) dt dt_1$$

$$k_{lin} = \frac{s_{Fzg,2} - v_0 T_2 + s_{slope,2}}{\int_0^{T_2} \int_0^{t_1} a_{Sens}(t) dt dt_1 - \frac{\bar{a}_{Sens,1}}{2} T_2^2}.$$

If a flat round trip having an initial speed and final speed of 0 is present during the calibration measurement, the equation simplifies to:

$$k_{lin} = \frac{s_{Fzg,2}}{\int_0^{T_2} \int_0^{t_1} a_{Sens}(t) dt dt_1 - \frac{\bar{a}_{Sens,1}}{2} T_2^2}.$$

$a_{offset}$ as well as $k_{lin}$ may be averaged over multiple calibration measurements in order to increase the accuracy, and may optionally be weighted with the duration of the calibration measurement/length of the measuring section.

A disadvantage of the method described thus far is that the speed and distance computed based on the wheel speeds are also subject, for example, to the tolerance of the tire radius. However, since the computations of other driving functions are likewise based on the measured wheel speed, this calibration of the acceleration sensor is consistent in the overall vehicle system.

However, the disadvantage may be remedied by the ascertainment of the vehicle speed and of the route also being based on satellite data/3D navigation map data. This may take place based on either the individual position measurements $$s_{Sat}(T) = \int_0^{T_2} \sqrt{\frac{dx(t)^2}{dt} + \frac{dy(t)^2}{dt} + \frac{dz(t)^2}{dt}} \, dt;$$

$$v_{Sat}(t) = \sqrt{\frac{dx(t)^2}{dt} + \frac{dy(t)^2}{dt} + \frac{dz(t)^2}{dt}};$$

or the speed, which is determined with the aid of an evaluation of the Doppler effect. The relative speed between the motor vehicle and a satellite is determined based on the changing time period between two successive GPS signals of the satellite. Based on the satellite trajectory data, the vehicle speed may be determined from the relative speed of the motor vehicle with respect to multiple satellites. In this case, the distance covered results in the following:

$$v_{Sat}(t) = \sqrt{v_{Sat,x}^2 + v_{Sat,y}^2 + v_{Sat,z}^2};$$

$$s_{Sat}(T) = \int_0^T v_{Sat}(t) dt;$$

$v_{Sat}$ may now be used instead of $v_{Fzg}$ for ascertaining the sensor offset during measured trips having an initial speed or final speed that is not equal to 0.

For computing the sensor gain factor, a first option is to initially calibrate the wheel diameter with the aid of the satellite data before this information is used to determine the sensor gain and the sensor offset of acceleration sensor 5 according to the above-described method for the calibration. The corrected values are thus available for all other functions which use the vehicle speed computed from the wheel speed.

$$s_{Fzg}(T) = \int_0^{T_2} v_{Fzg}(t) dt$$
$$= 2 r_{wheel} \pi A n z_{Umd\_wheel}$$
$$\equiv s_{Sat}(T)$$
$$= \int_0^{T_2} \sqrt{v_{Sat,x}^2 + v_{Sat,y}^2 + v_{Sat,z}^2} \, dt$$

$$T_{wheel,korr} = \frac{\int_0^{T_2} \sqrt{v_{Sat,x}^2 + v_{Sat,y}^2 + v_{Sat,z}^2} \, dt}{2 \pi A n z_{Umd\_wheel}}$$

Alternatively, the navigation data may also be directly used for computing the sensor offset and the sensor gain:

For the general computation of the sensor offset, the following expression thus results:

$$a_{Offset,Sat} = k_{lin}\bar{a}_{sens,1} - \bar{a}_{slope,1,Sat'} - \bar{a}_{Fzg,1,Sat}$$

where $$\bar{a}_{slope,1,Sat} = g\frac{h(T_1) - h(0)}{s_{Sat}(T_1)}; \bar{a}_{Fzg,1,Sat} = \frac{(v_{Sat}(T_1) - v_{Sat}(0))}{T_1},$$

and for the sensor gain:

$$k_{lin,Sat} = \frac{s_{Sat,2} - v_0 T_2 + s_{slope,2,Sat}}{\int_0^{T_2}\int_0^{T_1} a_{Sens}(t)dtdt_1 - \frac{\bar{a}_{Sens,1}}{2}T_2^2}$$

where $$s_{slope,2,Sat} = \int_0^{T_2}\int_0^{T_1} a_{slope,Sat}(t)dtdt_1 = \int_0^{T_2}\int_0^{T_1} g\frac{dh(t)/dt}{ds_{Sat}(t)/dt}dtdt_1.$$

Since the satellite data are updated only in discrete time increments, as a simplification, instead of a gradient computation a delta computation (h(t+Δt)−h(t))/(s(t+Δt)−s(t)) may be carried out. Likewise, the integral computation may be converted into a sum computation via scanned signals, using known methods from the field of digital identification and control systems.

As a supplement to the above method for a linear sensor model, other known methods such as identification and parameter estimation methods, neuronal networks, and fuzzy systems may also be used, for example to also estimate nonlinear models of acceleration sensor 5, such as $$a_{real}(t) = k_0 + k_1 a_{Sens} + k_2 a_{Sens}^2,$$

or to estimate models for acceleration sensor 5 which are linearized in sections. In addition to satellite data and navigation map data, position data of mobile wireless networks and other position determination systems may also be used in order to improve the position determination on measuring sections having poor satellite reception.

Another option for improving the calibration accuracy over the previous methods based on wheel speed information is to take into account the air pressure, or to additionally take into account the air pressure, for compensating for possible changes in height. Since the air pressure is a function of the height position of motor vehicle 1, the height difference may be computed from the change in air pressure. The atmospheric pressure sensor, for example, which is often present for other engine control functions, may be used for measuring the air pressure. Weather influences on the air pressure, which are superimposed on the height influence, may be compensated for by querying instantaneous reference air pressure values via the Internet, for example, during the measurement, and factoring out weather-related changes from the air pressure data. If no reference air pressure is available, it is at least possible to determine the maximum weather influence on the air pressure, and thus on the height computation, since the weather-related change in pressure per unit time is limited.

Plausibility checking may be necessary during the calibration in order to recognize possible influences on the route course, such as tunnels, and to terminate the calibration as needed if it is recognized that the air pressure has unexpectedly changed.

What is claimed is:

1. A method for calibrating an acceleration sensor for ascertaining a longitudinal acceleration of a motor vehicle, the method comprising:
   ascertaining, via a processor arrangement, a change in a vehicle speed during travel over a measuring section, wherein the ascertainment of the change in the vehicle speed during travel over the measuring section is at least carried out by evaluating wheel speed information of a wheel speed sensor;
   ascertaining, via the processor arrangement, a change in the longitudinal acceleration of the motor vehicle during travel over the measuring section with the acceleration sensor to be calibrated;
   ascertaining, via the processor arrangement, a change in a height position of the motor vehicle during travel over the measuring section;
   ascertaining, via a calibration device, at least one sensor parameter of a sensor model of the acceleration sensor based on the change in the vehicle speed, the change in the longitudinal acceleration of the motor vehicle, and the change in the height position of the motor vehicle during travel over the measuring section;
   providing, via the calibration device, the at least one sensor parameter to a safety device of a vehicle control unit;
   adjusting, via the safety device, a physical sensor variable of the acceleration sensor; and
   converting the physical sensor variable of the acceleration sensor to an actual longitudinal acceleration of the motor vehicle based on the at least one sensor parameter;
   wherein the calibration device is coupled with the vehicle control unit, which controls and monitors functions of the motor vehicle, and
   wherein the vehicle control unit includes the safety device for monitoring the motor vehicle for malfunctions.

2. The method as recited in claim 1, wherein the change in the vehicle speed during travel over the measuring section is effected with the aid of a means which is different from the acceleration sensor.

3. The method as recited in claim 1, wherein the at least one sensor parameter of the sensor model of the acceleration sensor includes at least one of a sensor gain and a sensor offset.

4. The method as recited in claim 1, wherein the change in the height position of the motor vehicle during travel over the measuring section is provided by at least one of:
   specifying a value of 0 when the measuring section is identified as a round trip;
   ascertaining the height positions at a beginning and at an end of the measuring section with the aid of a global positioning system; or
   measuring a change in air pressure at the beginning and at the end of the measuring section, and by determining the change in height of the motor vehicle as a function of the change in air pressure.

5. The method as recited in claim 1, wherein the wheel speed sensor is calibrated with the aid of position information which is ascertained from at least one of a global positioning system and navigation map data, the calibration relating to an adjustment of a wheel radius of a wheel provided with the wheel speed sensor.

6. The method as recited in claim 1, wherein the ascertainment of the change in the vehicle speed during travel over the measuring section is carried out by evaluating one of position information and speed information which is ascertained from at least one of a global positioning system and navigation map data.

7. A calibration device for calibrating an acceleration sensor for ascertaining a longitudinal acceleration of a motor vehicle, comprising:
- a calibration arrangement to one of ascertain and adapt at least one sensor parameter of a sensor model of the acceleration sensor, the calibration arrangement including:
  - a processor arrangement configured to perform the following:
    - ascertain a change in a vehicle speed during travel over a measuring section, wherein the ascertainment of the change in the vehicle speed during travel over the measuring section is at least carried out by evaluating wheel speed information of a wheel speed sensor;
    - ascertain a change in the longitudinal acceleration of the motor vehicle during travel over the measuring section with the aid of the acceleration sensor to be calibrated;
    - ascertain a change in a height position of the motor vehicle during travel over the measuring section;
    - ascertain, via the calibration arrangement, at least one sensor parameter of the sensor model of the acceleration sensor based on the change in the vehicle speed, the change in the longitudinal acceleration of the motor vehicle, and the change in the height position of the motor vehicle during travel over the measuring section;
    - provide, via the calibration arrangement, the at least one sensor parameter to a safety device of a vehicle control unit;
    - adjust, via the safety device, a physical sensor variable of the acceleration sensor; and
    - convert, via the safety device, the physical sensor variable of the acceleration sensor to an actual longitudinal acceleration of the motor vehicle based on the at least one sensor parameter;
  - wherein the calibration arrangement is coupled with the vehicle control unit, which controls and monitors functions of the motor vehicle, and
  - wherein the vehicle control unit includes the safety device for monitoring the motor vehicle for malfunctions.

8. A system for a motor vehicle, comprising:
- an acceleration sensor for providing information concerning a longitudinal acceleration of the motor vehicle;
- a vehicle control unit for carrying out a monitoring function for monitoring the motor vehicle as a function of the longitudinal acceleration, the control unit including a sensor model to ascertain an actual longitudinal acceleration of the motor vehicle from a physical variable of the acceleration sensor; and
- a calibration device to one of ascertain and adapt the at least one sensor parameter of the sensor model, the calibration device including:
  - a processor arrangement configured to perform the following:
    - ascertain a change in a vehicle speed during travel over a measuring section, wherein the ascertainment of the change in the vehicle speed during travel over the measuring section is at least carried out by evaluating wheel speed information of a wheel speed sensor;
    - ascertain a change in the longitudinal acceleration of the motor vehicle during travel over the measuring section with the aid of the acceleration sensor to be calibrated;
    - ascertain a change in a height position of the motor vehicle during travel over the measuring section;
    - ascertain, via the calibration device, the at least one sensor parameter of the sensor model based on the change in the vehicle speed, the change in the longitudinal acceleration of the motor vehicle, and the change in the height position of the motor vehicle during travel over the measuring section;
    - provide, via the calibration device, the at least one sensor parameter to a safety device of the vehicle control unit;
    - adjust, via the safety device, a physical sensor variable of the acceleration sensor; and
    - convert, via the safety device, the physical sensor variable of the acceleration sensor to an actual longitudinal acceleration of the motor vehicle based on the at least one sensor parameter;
  - wherein the calibration device is coupled with the vehicle control unit, which controls and monitors functions of the motor vehicle, and
  - wherein the vehicle control unit includes the safety device for monitoring the motor vehicle for malfunctions.

* * * * *